(12) United States Patent
Yamada et al.

(10) Patent No.: US 7,706,957 B2
(45) Date of Patent: Apr. 27, 2010

(54) APPARATUS FOR CONTROLLING QUANTITY OF FUEL TO BE ACTUALLY SPRAYED FROM INJECTOR IN MULTIPLE INJECTION MODE

(75) Inventors: Naoyuki Yamada, Kariya (JP); Minoru Imai, Kariya (JP); Kouji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/230,453

(22) Filed: Aug. 28, 2008

(65) Prior Publication Data

US 2009/0063017 A1 Mar. 5, 2009

(30) Foreign Application Priority Data

Aug. 30, 2007 (JP) ............................ 2007-224508
Aug. 30, 2007 (JP) ............................ 2007-224509

(51) Int. Cl.
*B60T 7/12* (2006.01)
*F02B 5/00* (2006.01)
(52) U.S. Cl. ..................................... 701/105; 123/305
(58) Field of Classification Search ................. 701/101, 701/103, 104, 105, 114, 115; 123/688, 674, 123/479, 295, 305
See application file for complete search history.

(56) References Cited

U.S. PATENT DOCUMENTS

| 5,758,632 | A | * | 6/1998 | Yamashita et al. | ........... | 123/688 |
|---|---|---|---|---|---|---|
| 5,937,822 | A | * | 8/1999 | Nakajima | ................... | 123/295 |
| 5,964,208 | A | * | 10/1999 | Yamashita et al. | ........... | 123/674 |
| 6,032,659 | A | * | 3/2000 | Yamashita et al. | ........... | 123/674 |
| 2006/0090733 | A1 | | 5/2006 | Fujii | | |
| 2006/0157032 | A1 | * | 7/2006 | Hori | ........................ | 123/458 |
| 2008/0011282 | A1 | * | 1/2008 | Miyashita | ................... | 123/672 |
| 2008/0025849 | A1 | * | 1/2008 | Okamoto et al. | ............ | 417/213 |
| 2008/0103675 | A1 | | 5/2008 | Ishizuka et al. | | |

FOREIGN PATENT DOCUMENTS

| JP | 2005-076561 | 3/2005 |
|---|---|---|
| JP | 2005-264810 | 9/2005 |
| JP | 2006-125371 | 5/2006 |
| JP | 2007-132334 | 5/2007 |
| JP | 2008-111377 | 5/2008 |

OTHER PUBLICATIONS

Japanese Office Action dated Jun. 23, 2009, issued in counterpart Japanese Application No. 2007-224508, with English translation.
Japanese Office Action dated Jun. 23, 2009, issued in counterpart Japanese Application No. 2007-224509, with English translation.

* cited by examiner

*Primary Examiner*—John T Kwon
(74) *Attorney, Agent, or Firm*—Nixon & Vanderhye, PC

(57) ABSTRACT

In an apparatus, an actual fuel spray characteristic obtaining unit obtains, based on an operation of a learning fuel injection instructing unit in a learning mode, an actual fuel spray characteristic of an injector relative to a variable of a target interval period within at least one section in a usable range therefor. A phase difference calculating unit calculates a phase difference between a reference fuel spray characteristic and the obtained actual fuel spray characteristic. A phase correcting unit shifts the reference fuel spray characteristic by the calculated phase difference such that the reference fuel spray characteristic is corrected to approach the obtained actual fuel spray characteristic.

17 Claims, 10 Drawing Sheets

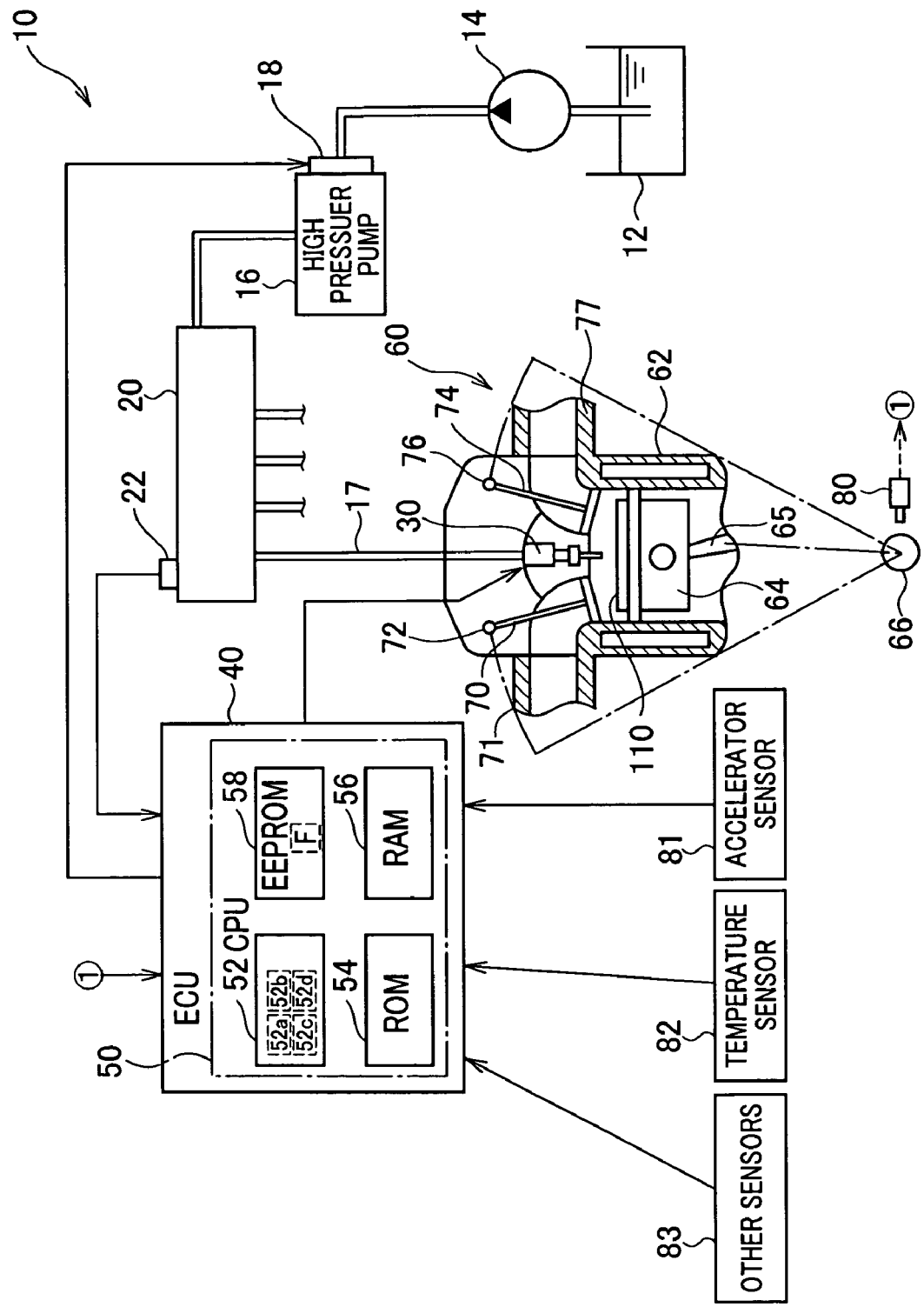

FIG.4
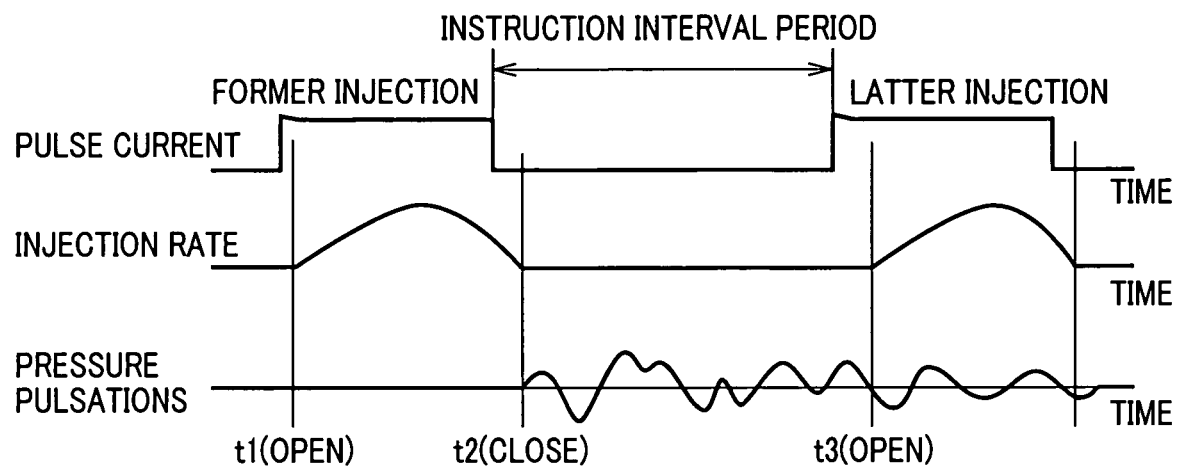
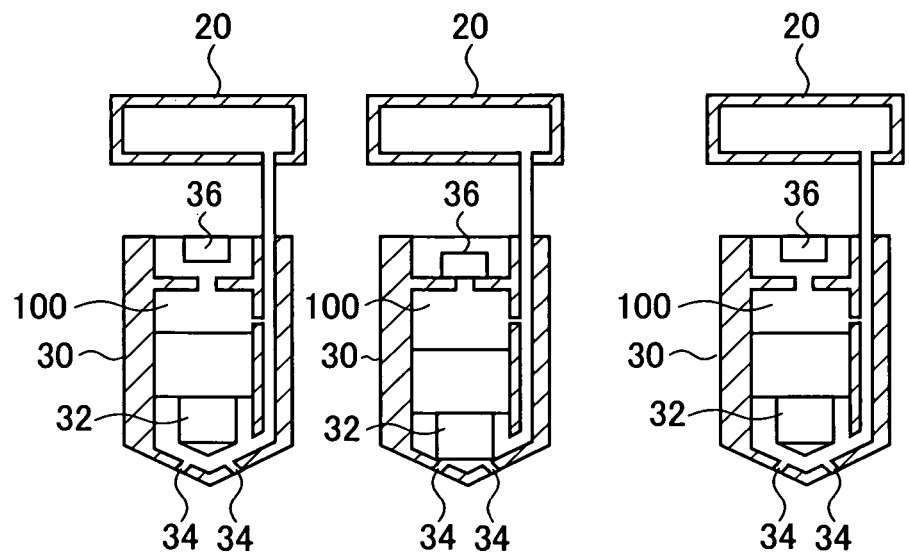

APPARATUS FOR CONTROLLING QUANTITY OF FUEL TO BE ACTUALLY SPRAYED FROM INJECTOR IN MULTIPLE INJECTION MODE

CROSS REFERENCE TO RELATED APPLICATION

This application is based on Japanese Patent Applications 2007-224508 and 2007-224509 each filed on Aug. 30, 2007. This application aims at the benefit of priority from the Japanese Patent Applications, so that the descriptions of which are all incorporated herein by reference.

FIELD OF THE INVENTION

The present invention relates to apparatuses for controlling a is quantity of fuel to be actually sprayed from an injector of an internal combustion engine operating in multiple injection mode. In the multiple injection mode, the internal combustion engine causes the injector to carry out multiple shots of fuel in one operating cycle of the internal combustion engine.

DESCRIPTION OF THE RELATED ART

Fuel injection systems are commonly used to control fuel injection by an injector for each cylinder of an internal combustion engine. In order to reduce combustion noise, nitrogen oxides ($NO_x$) emissions, and/or regeneration of an exhaust gas filter, one type of the fuel injection systems is designed to cause an injector to carry out, in a multiple injection mode (multistage injection mode), multiple shots of fuel in one operating cycle of the internal combustion engine.

The injector is normally designed to move a valve to open a port to thereby spray a quantity of fuel into a corresponding cylinder, and move the valve to close the port to thereby stop the spray of fuel thereinto.

In the multiple injection mode, the fuel injection system of the one type is designed to cause an injector to spray a small quantity of fuel into the engine before and after a main shot (main injection) of fuel. The main injection of fuel allows the engine to generate torque. The injection prior to the main injection of fuel will be referred to as "pilot injection" hereinafter, and the injection after the main injection will be referred to as "post injection".

In the multiple injection mode, water hammer occurs in the injector at the moment when the valve closes the port of the injector to stop the shot of fuel in each stage injection, resulting in pressure pulsations in the injector. The pressure pulsations cause influence on valve open/close timing of the injector. The magnitude of the pressure pulsations depends on an elapsed time since the stop of the shot of fuel in each injection stage.

For this reason, when the pressure pulsations occur in the injector in a former injection, the quantity of fuel sprayed from the injector in a latter injection following the former injection varies depending on an interval period. The interval period is defined as an interval period from the stop of the spray of fuel in a former injection to the start of spraying fuel in a latter injection following the former injection. For the sake of simplification, the interval period can be described as "interval period between former and latter injections" and the like hereinafter.

The variations in the quantity of fuel sprayed from an injector may reduce the accuracy in controlling the quantity of fuel to be sprayed from an injector.

Thus, a method for addressing such an accuracy reduction problem has been proposed. The method includes, at the time of shipment of a fuel injection system or the like, the steps of:

measuring a characteristic indicative of the relationship between interval period and pressure pulsation for each injector; and determining reference I-Q characteristic data in, for example, map format based on the measured characteristic.

The reference I-Q characteristic data represents a reference relationship between target interval period from a former injection by an injector to a latter injection following the former injection and correction value of a quantity of fuel actually sprayed from the injector in the latter injection.

Specifically, when a target interval period between a former injection and a latter injection carried out by an injector in the multiple injection mode is set, it is possible to reference the reference I-Q characteristic data to retrieve a correction value corresponding to the set target interval period. Thus, an instruction value corresponding to the target injection quantity for the latter injection is corrected based on the correction value, and thereafter, the corrected instruction value is outputted to the injector. This allows a quantity of fuel actually sprayed from the injector to be matched with the target quantity of fuel for the latter injection.

However, fuel spray characteristics of injectors vary depending on their individual variations (fabrication variations) and an aging of each injector. For this reason, an actual interval period between temporally adjacent fuel injections and a target interval period therebetween are different from each other.

This results in that, even if a target quantity of fuel to be sprayed from an injector in a latter injection is corrected based on a target interval period between a former injection and the latter injection, a quantity of fuel actually sprayed from the injector in the latter injection is deviated from the target quantity of fuel. The target quantity of fuel to be sprayed from an injector will be also referred to as "target injection quantity" hereinafter.

In order to address such a problem, a fuel injection system is disclosed in EP Patent Application Publication No. EP 1775454 corresponding to Japanese Patent Application Publication No. 2007-132334; these patent applications have been filed by the same applicant as this application.

The fuel injection system disclosed in the EP Patent is configured to, in a learning mode, instruct an injector to spray a target quantity of fuel in a first injection, and after a value of a target interval period has elapsed since the stop of the spray of fuel in the first injection, the injector to spray a target quantity of fuel in a second injection. The value of the target interval period is within one of divided sections of a total temporal range usable for the target interval period.

The fuel injection system is also configured to estimate a quantity of fuel actually sprayed from the injector in the second injection, and calculate a difference between the target quantity of fuel and the estimated quantity of fuel actually sprayed therefrom by the second injection.

Thus, the fuel injection system is configured to learn a deviation of an actual interval period from the value of the target injection period based on the calculated difference. The actual interval period is an interval period that has actually elapsed from the stop of the spray of fuel by the injector in the first injection to the start of spraying fuel by the injector in the second injection.

The learned deviation allows, in the multiple injection mode, correction of the reference I-Q characteristic data to match a quantity of fuel actually sprayed from the injector by the second injection with the target quantity of fuel.

SUMMARY OF THE INVENTION

As described above, the fuel injection system disclosed in the EP Patent is configured to learn a deviation of an actual interval period from the value of the target injection period located within one of the divided sections of the total temporal range usable for the target injection period and used for the second injection. The fuel injection system is also configured to correct a part of the reference I-Q characteristic data corresponding to one of the divided sections of the total useable range for the target injection period.

Specifically, the fuel injection system is configured to learn a deviation of an actual interval period from a value of the target injection period located within each of the remaining sections of the total temporal range usable for the target injection period. This may take a large amount of learning required before the learning is completed throughout the useable range.

A method different from the method disclosed in the EP patent is proposed. The method includes the steps of:

instructing an injector to carry out, as a multiple injection, a first shot of a first target quantity of fuel and a second shot of a second target quantity of fuel following the first shot while selecting one of a plurality of measurement points P of the target interval period spread out over the total temporal range usable for the target interval period; and measuring, as an actual injection quantity 200, a quantity of fuel actually sprayed from the injector by the first and second shots at each of the measurement points.

The method also includes the steps of:

instructing the injector to spray the first target quantity of fuel as a first single shot of fuel;

measuring a quantity of fuel actually sprayed from the first single shot of fuel;

instructing the injector to spray the second target quantity of fuel as a second single shot of fuel;

measuring a quantity of fuel actually sprayed from the second single shot of fuel; and calculating, as a reference injection quantity 202, the sum of the measured quantities of fuel actually sprayed from the injector by the first and second single shots of fuel to thereby calculate a difference between the actual injection quantities 200 at the respective measurement points P and the reference injection quantity 202 (see FIG. 10).

This allows learning of a variation in a quantity of fuel actually sprayed from the injector by the second injection versus the total temporal range usable for the target interval period.

The reference injection quantity 202 is unaffected by pressure pulsations in the injector because the sum of the quantities of fuel actually sprayed from the injector by the first and second single shots of fuel is measured.

Particularly, in order to learn a variation in the quantity of fuel actually sprayed from the injector by the second shot of fuel in the multiple injection, the first target quantity of fuel is set to be equal to the second target quantity of fuel. Additionally, the double of the measured quantity of fuel actually sprayed by the first single shot of fuel is determined as the reference injection quantity 202 without carrying out 16 the second single shot of fuel.

However, the quantity of fuel actually sprayed from the injector in each of the multiple first and second shots of fuel includes measurement errors, and similarly, the quantity of fuel actually sprayed from the injector in each of the first and second single shots of fuel includes measurement errors.

Therefore, learning of the variation in the quantity of fuel actually sprayed from the injector by the second shot of fuel in the multiple injection due to pressure pulsations depending on an actual interval period between the first and second shots of fuel in the multiple injection may reduce the accuracy of the learning.

In view of the background, an object of at least one aspect of the present invention is to provide systems for:

instructing an injector to carry out, as a multiple injection, a first shot of fuel, and after a target interval period has elapsed since a stop of the first shot of fuel, carry out a second shot of fuel; and learning a deviation, from the target interval period, of an actual interval period actually elapsed from the stop of the first shot of fuel to a start of the second shot of fuel with high accuracy throughout a total temporal range usable for the target interval period.

In order to achieve such an object, the inventors of this application have focused on the fact that:

a transition curve of an injection rate measured during the spray of a target quantity of fuel by an injector over time before and after the stop of the spray of fuel is changed with change in the target quantity of fuel as 2 mm$^3$/st, 10 mm$^3$/st, 40 mm$^3$/st, and 80 mm$^3$/st (see FIG. 1A). The unit "mm$^3$/st" represents a quantity (mm$^3$) of fuel to be sprayed from an injector per stroke of its needle valve. The timing when the spray of the target quantity of fuel is stopped is set to "0 (ms)" as a reference timing.

The inventors of this application also have focused on the fact that:

a transition curve of a pressure in the injector over time before and after the stop of the spray of fuel is changed with change in the target quantity of fuel as 2 mm$^3$/st, 10 mm$^3$/st, 40 mm$^3$/st, and 80 mm$^3$/st.

As clearly illustrated in FIG. 1A, the transition curves of the injection rates for the respective different target injection quantities in the former injection relative to interval period from the stop of the former injection to the start of the latter injection are different from each other before the stop of the spray of fuel in the former injection.

In contrast, the transition curves of the injection rates for the respective different target injection quantities in the former injection relative to interval period after the stop of the spray of fuel in the former injection are substantially identical to each other.

Moreover, the transition curves of the pressures in the injector for the respective different target injection quantities relative to interval period in the former injection are different from each other before the stop of the spray of fuel in the former injection.

In contrast, the transition curves of the pressures in the injector for the respective different target injection quantities after the stop of the spray of fuel in the former injection are substantially identical to each other.

In other words, the characteristics in pressure pulsations in the injector for the respective different target injection quantities are substantially in agreement with each other irrespective of an elapsed time from the stop of the spray of fuel in the former injection.

In addition, when a plurality of sets of first and second shots of fuel in the multiple injection mode are carried out while a target interval period between the first shot and the second shot of each set is changed such that:

a target injection quantity for the first shot of each set is different from that for the first shot of another set;

a target injection quantity for the second shot of each set is the same as that for the second shot of another set; and a timing of stopping the first shot of each set is the same as that of stopping the first shot of another set, the inventors have founded that:

transition curves of quantities "Q" of fuel actually sprayed from the injector by the plurality of sets of first and second shots of fuel versus the variation in the target interval period are substantially periodic and identical to each other (see FIG. 1B).

For example, the transition curve of the actual injection quantity "Q" by one of the plurality of sets of first and second shots of fuel when the target injection quantity for the first shot is set to 50 mm$^3$/st versus the variation in the target interval period is illustrated by the solid curve in FIG. 1B. Similarly, the transition curve of the actual injection quantity "Q" by another one of the plurality of sets of first and second shots of fuel when the target injection quantity for the first shot is set to 10 mm$^3$/st versus the variation in the target interval period is illustrated by the dash-dot curve in FIG. 1B. Additionally, the transition curve of the actual injection quantity "Q" by another one of the plurality of sets of first and second shots of fuel when the target injection quantity for the first shot is set to 2 mm$^3$/st versus the variation in the target interval period is illustrated by the dashed curve in FIG. 1B.

Specifically, a variation in a quantity of fuel actually sprayed from an injector by a second injection following a first injection in the multiple injection mode is strongly dependent upon a variation in an actual target interval period between the first and second injections.

Thus, actual I-Q characteristic data of the injector is different in phase from the reference I-Q characteristic data.

A plurality of aspects of the present invention are designed based on the background described above.

Specifically, according to one aspect of the present invention, there is provided an apparatus for controlling, in a multiple injection mode, an injector to spray a quantity of fuel into an internal combustion engine in a former injection, and after a target interval period has elapsed, controlling the injector to spray a quantity of fuel into the internal combustion engine in a latter injection. The apparatus includes a storing unit configured to store therein a reference fuel spray characteristic of the injector relative to a variable of a target interval period within a usable range determined for the target interval period. The target interval period represents an interval between a stop of a spray of fuel by the injector in the former injection and start of spraying fuel by the injector in the latter injection. The reference fuel spray characteristic at least depends on a quantity of fuel actually sprayed from the injector in the latter injection. The apparatus includes an actual fuel spray characteristic obtaining unit configured to obtain an actual fuel spray characteristic of the injector relative to the variable of the target interval period within at least one section in the usable range. The apparatus includes a phase difference calculating unit configured to calculate a phase difference between the reference fuel spray characteristic and the obtained actual fuel spray characteristic. The apparatus includes a phase correcting unit configured to shift the reference fuel spray characteristic by the calculated phase difference such that the reference fuel spray characteristic is corrected to approach the obtained actual fuel spray characteristic.

According to another aspect of the present invention, there is provided a fuel injection system. The fuel injection system includes an accumulator, and a fuel pump configured to pressurize fuel and feed the pressurized fuel to the accumulator so that the pressurized fuel is stored in the accumulator. The fuel injection system includes an injector for injecting the fuel stored in the accumulator into a cylinder of an internal combustion engine, and an apparatus according to claim 1 for controlling, in a multiple injection mode, the injector to spray a quantity of fuel into the internal combustion engine in a former injection, and after a target interval period has elapsed, controlling the injector to spray a quantity of fuel into the internal combustion engine in a latter injection.

In the one aspect and another aspect of the present invention, "unit" can be configured by at least one hardwired circuit, at least one programmed circuit, at least one functional component of a computer, or combinations thereamong. The units can be individual components in hardware, or can be combined in hardware but individual components in software.

BRIEF DESCRIPTION OF THE DRAWINGS

Other objects and aspects of the invention will become apparent from the following description of embodiments with reference to the accompanying drawings in which:

FIG. 2 is a view schematically illustrating an example of the structure of a fuel injection system according to a first embodiment of the present invention;

FIG. 4 is a timing chart schematically illustrating a relationship between temporally adjacent fuel injections by an injector in a multiple injection mode and pressure pulsations occurring in the injector according to the first embodiment;

DETAILED DESCRIPTION OF EMBODIMENTS OF THE INVENTION

Figure 1A:
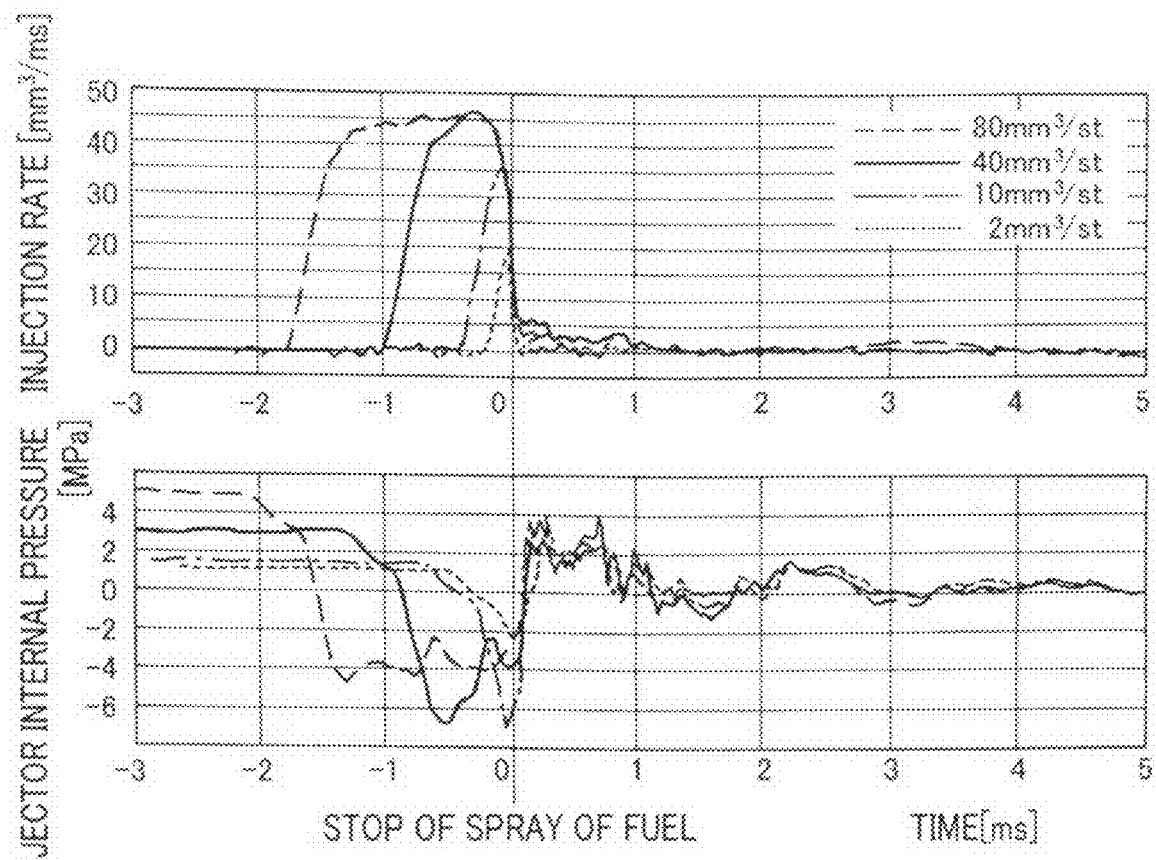
FIG. 1A is graphs, one of which schematically illustrates transition curves of injection rates for respective different target injection quantities in a former injection relative to interval period from the stop of the former injection to the start of a latter injection, the other of which schematically illustrates transition curves of pressures in an injector for the respective different target injection quantities relative to interval period in the former injection.

Embodiments of the present invention will be described hereinafter with reference to the accompanying drawings.

First Embodiment

Referring to FIG. 2, there is illustrated the overall structure of a fuel injection system 10 installed in a motor vehicle according to a first embodiment of the present invention. The fuel injection system 10 includes a direct fuel-injection engine 60, such as a diesel engine 60, installed in the motor vehicle, and works to supply fuel to the diesel engine 60.

The fuel injection system 10 also includes a fuel tank 12, a feed pump 14, a high pressure pump 16 with a regulating valve 18, an accumulator 20, injectors 30, an ECU (Electronic Control Unit) 40 serving as a control apparatus, and the like.

The diesel engine 60 is equipped with a plurality of, for example four, inner hollow cylinders 62 where combustion takes place.

The diesel engine 60 is equipped with a plurality of, such as four, pistons 64 installed in the plurality of cylinders 62, respectively. One of these cylinders 62 is schematically illustrated in FIG. 2 for the sake of simplification. The cylinders 62 are integrated with each other to form a cylinder block.

The piston 64 is closed at one end, such as the bottom, of the cylinder 62 and open at the other end, such as the head. The piston 64 is reciprocably movable between a compression top dead center (TDC) and a bottom dead center (BDC) in the cylinder 62. The head of the corresponding piston 64, the cylinder walls, and the head of the cylinder 62 constitute a combustion chamber of the cylinder 62. The piston 64 installed in each cylinder 62 is linked to a crankshaft 66 of the diesel engine 60 via a connecting rod 65.

The diesel engine 60 is further equipped with an intake valve 70 and an exhaust valve 74 for each cylinder 62. The diesel engine 60 is equipped with a pair of camshafts 72 and 76. Each of the camshafts 72 and 76 is designed to be rotated by rotation of the crankshaft 66.

The intake valve 70 is installed in the cylinder head of a corresponding cylinder 62 and rotatably driven by rotation of the camshaft 72. Specifically, the intake valve 70 is driven to open to thereby allow air flowing through an intake port 71 to enter into the corresponding cylinder 62 therethrough. The intake valve 70 is also driven to close to thereby form part of the combustion chamber during the compression and power strokes of the four-stroke cycle.

The exhaust valve 74 is installed in the cylinder head of a corresponding cylinder 62 and rotatably driven by rotation of the camshaft 76. Specifically, the exhaust valve 74 is driven to open to thereby allow burned exhaust gas in the corresponding cylinder 62 to escape out of the cylinder 62. The exhaust valve 74 is also driven to close to thereby form part of the combustion chamber during the compression and power strokes of the four-stroke cycle.

The fuel tank 12 is configured to communicate with the feed pump 14 and charges fuel used for the combustion of each cylinder 62.

The feed pump 14 is configured to communicate with the high pressure pump 16. The feed pump 14 works to pump up the fuel stored in the fuel tank 12 to feed the pumped fuel to the high pressure pump 16.

For example, the high pressure pump 16 is equipped with a drive shaft linked to the crankshaft to be rotatable therewith. The high pressure pump 16 is also equipped with a plunger installed in a cylinder and liked to the drive shaft. The plunger is reciprocably movable between a compression top dead center (TDC) and a bottom dead center (BDC) in a cylinder in synchronization with rotation of, for example, the camshaft 76 via the drive shaft.

In the high pressure pump 16, fuel fed from the feed pump 14 is entered into the regulating valve 18 to be adjusted in flow-rate by the regulating valve 18. The fuel with the regulated flow-rate is fed into a compression chamber of the cylinder during the plunger being moved from the TDC to the BDC in synchronization with rotation of the camshaft 66.

Thereafter, during the plunger being moved from the BDC to the TDC in synchronization with rotation of the camshaft 66, the fuel stored in the compression chamber is pressurized by the plunger so that the pressurized fuel is fed into the accumulator 20.

The accumulator 20 is designed as, for example, a common rail constructed from, for example, a series of accumulating sections interconnected by small-bore piping. The accumulator will be referred to as "common rail" hereinafter.

The common rail 20 is configured to be in communication with each of the cylinders 62 via a high-pressure fuel passage 17 and a corresponding injector 30 so as to be shared by the cylinders 62.

The common rail 20 is operative to accumulate therein the high-pressurized fuel delivered from the high pressure pump 16 with its pressure kept high.

Specifically, the fuel injection system 10 includes a pressure sensor 22. The pressure sensor 22 is partly installed in the common rail 20 and designed to continuously or repetitively measure the pressure of fuel charged in the common rail 20. The pressure sensor 22 is electrically connected to the ECU 40 and operative to send, to the ECU 40, a measured value of the pressure of fuel stored in the common rail 20. The pressure of fuel stored in the common rail 20 and measured by the pressure sensor 22 will be referred to as "rail pressure" hereinafter.

The regulating valve 18 is electrically connected to the ECU 40. Under control of the ECU 40, the regulating valve 18 works to adjust the amount of fuel being fed from the feed pump 14 to be delivered into the compression chamber of the high pressure pump 16 to thereby control the rail pressure such that the rail pressure is in agreement with a target pressure preset by the ECU 40.

The common rail 20 is also operative to uniformly feed the high-pressurized fuel accumulated therein to the individual injectors 30 via the respective high-pressure fuel passages 17.

Each of the injectors 30 is installed at its one distal end in the combustion chamber of a corresponding one of the cylinders 62, allowing the pressurized fuel to be directly sprayed out into the combustion chamber.

Figure 3:
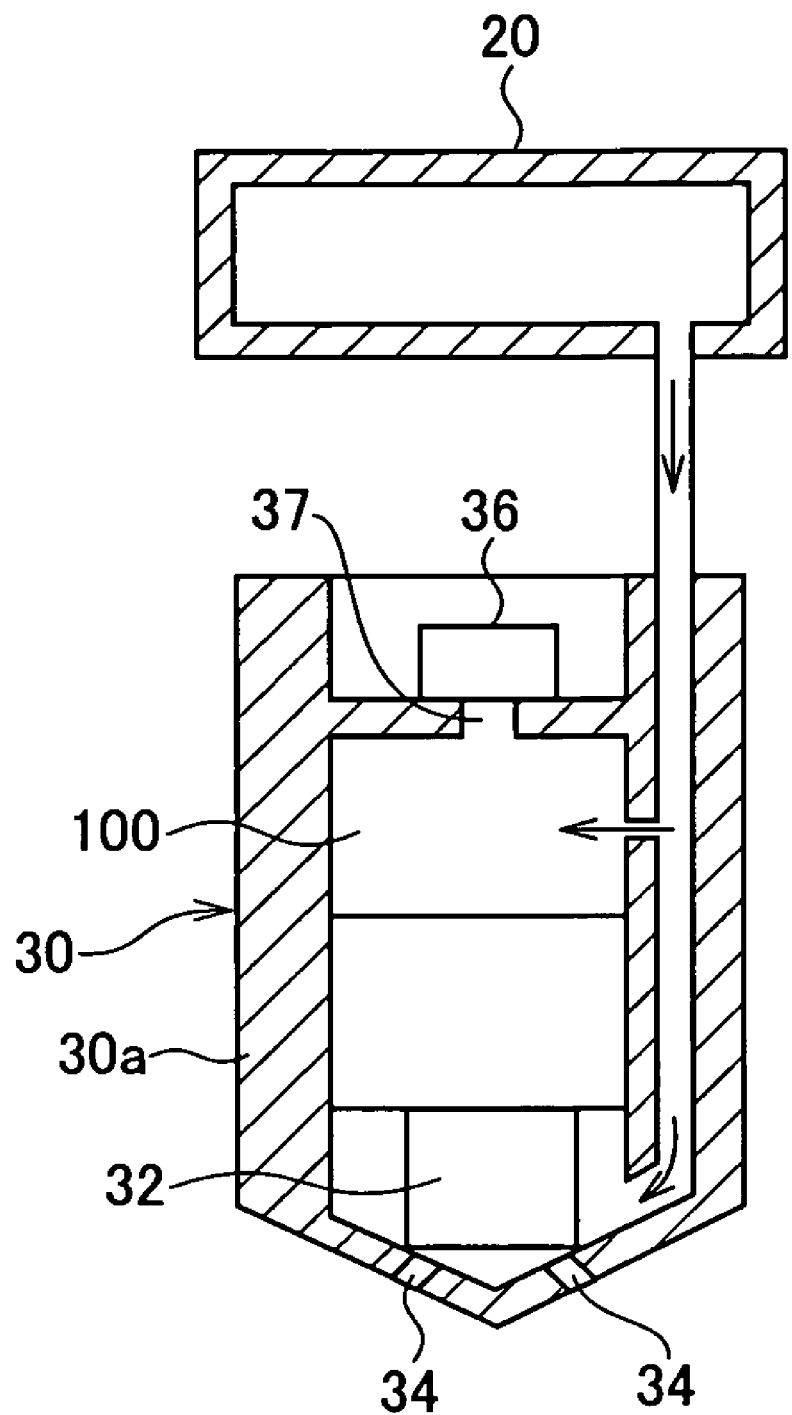
FIG. 3 is a partially cross sectional view of each injector illustrated in FIG. 2.

Specifically, referring to FIG. 3, the injector 30 consists essentially of a substantially cylindrical housing 30a. The housing 30a is formed at the interior with a follow chamber 30b arranged in the length direction thereof. The housing 30a is also formed at an inner peripheral wall of its one end (fuel-spraying end) with a valve seat 30c at the center thereof. The valve seat 30c has fuel spray nozzles 34 in communication with the exterior of the injector 30 and with the hollow chamber 30b.

The injector 30 also consists essentially of a nozzle needle (needle valve) 32 installed in the first hollow chamber 32. The nozzle needle 32 is arranged to be openable and closeable in the fuel spray nozzles 34.

The nozzle needle 32 is biased by a pressure of fuel stored in a compression chamber 100 formed in the housing 30a so that it is seated on the valve seat 30c to close the fuel spray nozzles 34. Into the compression chamber 100 and the hollow chamber 30b, the high-pressurized fuel is applied from the common rail 20.

The injector 30 further consists essentially of a solenoid or piezoelectric valve actuator 36 with a valve element arranged to be openable and closeable in a low-pressure passage 37 formed in the housing 36a and communicating with the compression chamber 100. The valve actuator 36 is electrically connected to the ECU 40.

Specifically, when energized by the ECU 40, the valve actuator 36 of a given injector 30 works to move the valve element to open the low-pressure passage 37. This allows the pressure of fuel charged in the compression chamber 100 to be reduced.

The reduction in the pressure of fuel stored in the compression chamber 100 allows the nozzle needle 32 to rise from the valve seat 30c against the biasing of the pressure of fuel stored in the compression chamber 100 to thereby open the fuel spray nozzles 34. This results in spraying fuel fed from the common rail 20 into the combustion chamber of a corresponding cylinder 62.

In contrast, when power supply is interrupted to the valve actuator 36, the valve actuator 36 of the given injector 30 works to move the valve element to close the low-pressure passage 37. This allows the pressure of fuel charged in the compression chamber 100 to increase. The increase in the pressure of fuel stored in the compression chamber 100 allows the nozzle needle 32 to fall toward the valve seat 30c by the biasing of the pressure of fuel stored in the compression chamber 100 to thereby close the fuel spray nozzles 34. This results in stopping the spray of fuel fed from the common rail 20 into the combustion chamber of a corresponding cylinder 62.

Specifically, as described above, when energized, the injector 30 is designed to spray fuel during the energization duration. In other words, the ECU 40 works to apply, to the injector 30, a pulse current with a pulse width (pulse duration) corresponding to the energization duration.

Therefore, control of the pulse width of the pulse current to be applied to the injector 30 can adjust a quantity of fuel to be sprayed from the injector 30 to a target injection quantity. The energization period for the injector 30 will be also referred to as "current pulse width" hereinafter. The current pulse width for the injector 30 is used as an instruction value to be outputted to the injector 30 for spraying a target quantity of fuel corresponding to the instruction value.

Returning to FIG. 2, the ECU 40 is integrated with a microcomputer 50 and its peripherals. The microcomputer 50 consists of a CPU 52, a ROM 54, a RAM 56, an EEPROM 58 as an example of nonvolatile memories, various I/O (Input and output) ports, and so on.

At least one control program that instructs the ECU 40 (CPU 52) to function as an actual I-Q characteristic data computing module 52a, a phase difference calculating module 52b, a phase correction module 52c, and a fuel-spray correction module 52d.

In the first embodiment, a characteristic indicative of the relationship between interval period and pressure pulsation for each injector 30 is previously measured, and reference I-Q characteristic data F is determined beforehand based on the measured characteristic in, for example, map format or function formula format. The reference I-Q characteristic data F is stored beforehand in, for example, the EEPROM 58, the ROM 54, and/or the RAM 56 of the ECU 40.

The reference I-Q characteristic data represents a reference relationship between target interval period from a former injection by an injector to a latter injection following the former injection and correction value of a quantity of fuel actually sprayed from the injector in the latter fuel injection.

Specifically, when a target interval period between a former injection and a latter injection carried out by an injector 30 in the multiple injection mode is set, the ECU 40 works to reference the reference I-Q characteristic data to retrieve a correction value corresponding to the set target interval period. Thus, the ECU 40 corrects, based on the correction value, an instruction value corresponding to a target quantity of fuel for the latter injection, thus outputting the corrected instruction value to the injector 30. This allows a quantity of fuel actually sprayed from the injector 30 to be matched with the target quantity of fuel for the latter injection.

The fuel injection system 10 includes an engine speed sensor 80, an accelerator sensor (throttle position sensor) 81, a temperature sensor 82, and other sensors 83; these sensors 80, 81, 82, and 83 are used for measuring parameters indicating the operating conditions of the diesel engine 60 and the driving conditions of the motor vehicle.

The engine speed sensor 80 is electrically connected to the ECU 40 and operative to measure data indicative of an RPM of the diesel engine 10 based on a crank angle of the crankshaft 66, and to output, to the ECU 40, the measured data as an engine speed.

The accelerator sensor 81 is electrically connected to the ECU 40. The accelerator sensor 81 is operative to measure an actual position or stroke of an accelerator pedal of the motor vehicle operable by the driver and to output, as data representing a driver's torque request (torque increase request or torque reduction request) for the diesel engine 60, the measured actual stroke or position of the accelerator pedal to the ECU 40.

The temperature sensor 82 is electrically connected to the ECU 40 and operative to continuously or periodically measure data indicative of a temperature of an engine coolant, and continuously or periodically output, to the ECU 40, measured data.

Each of some of the other sensors 83 is operative to measure an instant value of a corresponding one parameter indicative of the operating conditions of the diesel engine 60 and to output, to the ECU 40, the measured value of a corresponding one parameter.

Each of the remaining sensors 83 is operative to measure an instant value of a corresponding one parameter indicative of the driving conditions of the motor vehicle and to output, to the ECU 40, the measured value of a corresponding one parameter.

The ECU 40 is operative to:

receive pieces of data measured by the sensors 22, 80, 81, 82, and 83 and sent therefrom; and control, based on the operating conditions of the diesel engine 60 determined by at least some of the received pieces of data measured by the sensors 22, 80, 81, 82, and 83, various actuators installed in the diesel engine 60 and including the injectors 30 and the regulating valve 18 to thereby adjust various controlled variables of the diesel engine 60.

Specifically, the ECU 40 is programmed to:

compute the target pressure for the rail pressure based on the operating conditions of the diesel engine 60 determined by at least some of the received pieces of data measured by the sensors 22, 80, 81, 82, and 83; and control the regulating valve 18 such that the rail pressure is matched with the computed target pressure.

In addition, in order to reduce combustion noise and/or nitrogen oxides ($NO_x$) emissions, the ECU 40 is programmed to carry out, in a multiple injection mode, multiple injections (multiple shots of fuel) including at least one main injection and at least one auxiliary injection, such as a pilot injection and/or a post injection, before or after the main injection.

Specifically, the ECU 40 is programmed to:

compute a proper target timing, a proper target injection quantity, and/or a proper value of another operating parameter for each of the multiple injections by each of the injectors 30 based on the determined operating conditions of the diesel engine 60; and output, to each of the injectors 30, an instruction value corresponding to a corresponding one of the target injection quantities computed for each of the multiple injections at the proper target injection timing computed for each of the multiple injection; this instruction value instructs each of the injectors 30 to spray the corresponding one of the target injection quantities.

FIG. 4 schematically illustrates a relationship between temporally adjacent fuel injections by an injector 30 in the multiple injection mode and pressure pulsations occurring in the injector 30. The pressure pulsations are caused due to water hammer occurring in the injector 30 at the moment when the nozzle needle 32 closes the fuel spray nozzles 34 to stop the shot of fuel in a former injection in the temporally adjacent fuel injections.

Specifically, in the multiple injection mode, the ECU 40 outputs, to the injector 30, a pulse current with a current pulse width corresponding to a target injection quantity as the instruction value for the former injection. The pulse current causes the nozzle needle 32 of the injector 30 to open the fuel spray nozzles 34 via the valve actuator 36 to thereby spray the target quantity of fuel into a corresponding cylinder 62 as the former injection (see t1 in FIG. 4).

Thereafter, when a period corresponding to the current pulse width of the current pulse has elapsed since the start of supplying the pulse current, the ECU 40 stops the supply of the pulse current to the injector 30. This causes the nozzle needle 32 of the injector 30 to close the fuel spray nozzles 34 to thereby stop the spray of fuel into the corresponding cylinder 62 (see t2 in FIG. 4).

At the moment when the nozzle needle 32 closes the fuel spray nozzles 34, water hammer occurs in the injector 30, resulting in pressure pulsations in the injector 30 (see FIG. 4).

After an instruction interval period has elapsed since the falling edge of the pulse current for the former injection, the ECU 40 outputs, to the injector 30, a pulse current with a current pulse width corresponding to a target injection quantity as the instruction value for the latter injection. The pulse current causes the nozzle needle 32 of the injector 30 to open the fuel spray nozzles 34 via the valve actuator 36 to thereby spray the target quantity of fuel into a corresponding cylinder 62 as the latter injection (see t3 in FIG. 4).

The pressure pulsations cause influence on valve open/close timing of the injector 30. The magnitude of the pressure pulsations depends on an elapsed time since the stop of the shot of fuel in the former injection.

Figure 5:
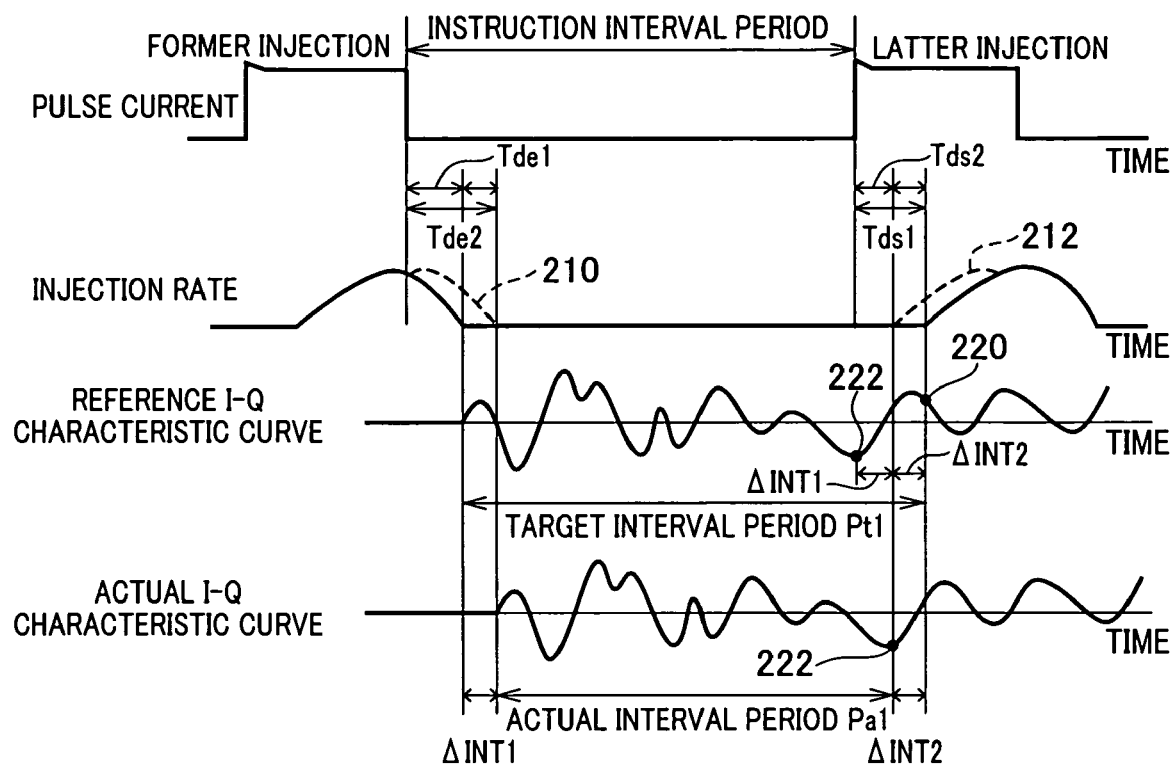
FIG. 5 is a timing chart schematically illustrating a relationship between open/close timing of a nozzle needle of an injector and corresponding rising/falling timing of a current pulse and a relationship among an instruction target interval period, a target interval period, and an actual interval period according to the first embodiment.

Referring to FIG. 5, the close timing of the nozzle needle 32 in the former injection is delayed by a time Tde1 relative to the falling edge (falling timing) of the current pulse for the former injection. In addition, the open timing of the nozzle needle 32 in the latter injection is delayed by a time Tds1 relative to the rising edge (rising timing) of the current pulse for the latter injection.

Thus, it is necessary to preset the delay time Tde1 and the delay time Tds1 so as to determine a target interval period based on the instruction interval period and both the preset delay times Tde1 and Tds1. For example, the target interval period is expressed by the following equation [1]:

$$Pt = Pi - Tde1 + Tds1 \quad [1]$$

where Pt represents the target interval period, and Pi represents the instruction interval period.

However, a falling timing of the injection rate of an injector (target injector) 30 in the former injection and a rising timing of the injection rate of the target injector 30 in the latter injection are changed due to its fabrication variation and its aging. For example, the falling timing of the injection rate of the target injector 30 in the former injection is delayed relative to a designed falling timing of the injection rate thereof (see reference numeral "210"). Similarly, the rising timing of the injection rate of the one injector 30 in the latter injection is delayed relative to a designed rising timing of the injection rate thereof (see reference numeral "212").

The delay of the falling timing of the target injector 30 relative to the designed falling timing causes variations in the delay time of the close timing of the nozzle needle 32 from the preset value Tde1 to a value Tde2. Similarly, the delay of the rising timing of the target injector 30 relative to the designed rising timing causes variations in the delay time of the open timing of the nozzle needle 32 from the preset value Tds1 to a value Tds2.

Thus, the target interval period is out of phase with an actual interval period by the sum of a time length ΔINT1 and a time length ΔINT2 at the timing of starting the latter injection; this sum of the time length ΔINT1 and the time length ΔINT2 is expressed by "ΔINT1+ΔINT2". The time length ΔINT1 corresponds to a difference of the preset delay time Tde1 from the delay time Tde2, and the time length ΔINT2 corresponds to a difference of the delay time Tds2 from the preset delay time Tds1.

Specifically, as illustrated in FIG. 5, an actual I-Q characteristic indicative of a relationship between actual interval period from the former injection by the target injector 30 to the latter injection and correction value of a quantity of fuel actually sprayed from the target injector 30 in the latter injection is out of phase with the reference I-Q characteristic by the time length "ΔINT1+ΔINT2".

Let us assume that the phase difference between the reference I-Q characteristic and the actual I-Q characteristic is not considered.

In this assumption, when a value Pt1 of the target interval period between the former injection and the latter injection by the injector 30 is set, a correction value at a point 220 of the reference I-Q characteristic corresponding to the set value Pt1 of the target interval period would be obtained. Thus, an instruction value corresponding to the target injection quantity for the latter injection would be corrected based on the correction value at the point 220 of the reference I-Q characteristic.

However, a value Pa1 of the actual interval period between the former injection and the latter injection by the injector 30 is shorter than the value Pt1 of the target interval period by the time length "ΔINT1+ΔINT2". For this reason, the correction value at the point 220 of the reference I-Q characteristic is different from a correction value at a point 222 of the actual I-Q characteristic corresponding to the value Pa1 of the actual interval period; this correction value at the point 222 of the actual I-Q characteristic should be used to correct an instruction value corresponding to the target injection quantity for the latter injection.

This may reduce the accuracy of correcting a quantity of fuel actually sprayed from the injector 30.

In contrast, the fuel injection system 10 according to the first embodiment is designed to consider the phase difference between the reference I-Q characteristic and the actual I-Q characteristic.

Figure 1B:
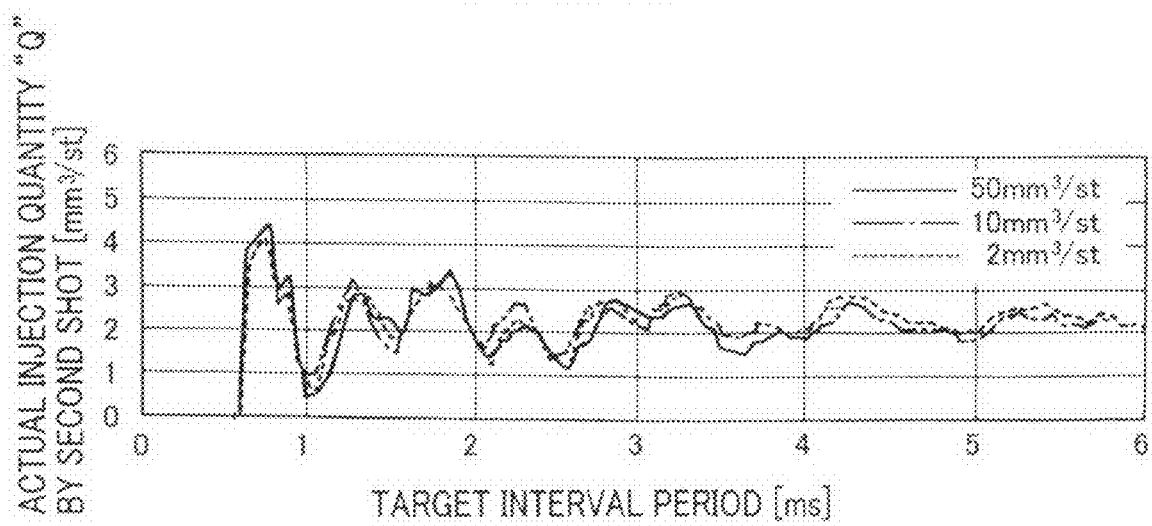
FIG. 1B is a graph schematically illustrating transition curves of quantities of fuel actually sprayed from an injector by a plurality of sets of first and second shots of fuel versus a variation in a target interval period.

Specifically, as described above and illustrated in FIGS. 1A and 1B, the characteristics in pressure pulsations in an injector for respective different target injection quantities are substantially in agreement with each other irrespective of an interval period between the stop of the spray of fuel in a former injection and the start of spraying fuel in a latter injection following the former injection.

In addition, when a plurality of sets of first and second shots of fuel in the multiple injection mode are carried out while a target interval period between the first shot and the second shot of each set is changed such that:

a target injection quantity for the first shot of each set is different from that for the first shot of another set;

a target injection quantity for the second shot of each set is the same as that for the second shot of another set; and a timing of stopping the first shot of each set is the same as that of stopping the first shot of another set, transition curves of quantities "Q" of fuel actually sprayed from the injector 30 by the plurality of sets of first and second shots of fuel versus the variation in the target interval period are substantially identical to each other.

Specifically, a variation in a quantity of fuel actually sprayed from the injector 30 by a latter injection following a former injection in the multiple injection mode is strongly dependent upon a variation in an actual interval period between the former and latter injections.

Thus, even if an actual interval period between a former injection and a latter injection in the multiple injection mode varies, an actual I-Q characteristic of each of the injectors 30 is different in phase from the reference I-Q characteristic.

For this reason, the fuel injection system 10 according to the first embodiment is configured to operate, in a learning mode, to:

calculate a phase difference between the reference I-Q characteristic and an actual I-Q characteristic actually calculated by the ECU 40 described hereinafter; and correct the reference I-Q characteristic such that the reference I-Q characteristic is shifted by the calculated phase difference to thereby match the corrected reference I-Q characteristic with the actual I-Q characteristic.

The corrected reference I-Q characteristic allows the ECU 40 operating in the multiple injection mode to correct a quantity of fuel actually sprayed from a latter injection following a former injection carried out in the multiple injection mode.

Next, operations of the ECU 40 according to the first embodiment will be described hereinafter.

At least one of the memories 58, 54, and 56 of the ECU 40, such as the EEPROM 58 in the first embodiment, serves as a storing module that stores beforehand the reference I-Q characteristic data F.

More specifically, the reference I-Q characteristic data F represents a reference relationship between a variable of a target interval period from a former injection by each of the injectors 30 to a latter injection following the former injection and a variable of a correction value of a quantity of fuel actually sprayed from a corresponding one of the injectors 30 in the latter injection; this variable of the target interval period belongs to a total temporal range usable for the target injection period.

Specifically, the correction value of the quantity of fuel actually sprayed from an injector 30 is, for example, set as a correction value of the falling timing of a current pulse to be applied to the injector 30 in the latter injection; this current pulse controls the quantity of fuel actually sprayed from the injector 30 in the latter injection. Correction of the falling timing of the current pulse to be applied to the injector 30 in the latter injection allows a current pulse width of the current pulse to be adjusted, thus changing the quantity of fuel actually sprayed from the injector 30 in the latter injection.

The sign of the correction value in the reference I-Q characteristic data at a given value of the target interval period is positive when a quantity of fuel actually sprayed from an injector 30 corresponding to the given value of the target interval period is lower than a corresponding target injection quantity. In addition, the sign of the correction value in the reference I-Q characteristic data at a given value of the target interval period is negative when a quantity of fuel actually sprayed from an injector 30 corresponding to the given value of the target interval period is higher than a corresponding target injection quantity.

For example, the reference I-Q characteristic data F for each injector 30 is determined while being adjusted and stored in the EEPROM 58.

Figure 6:
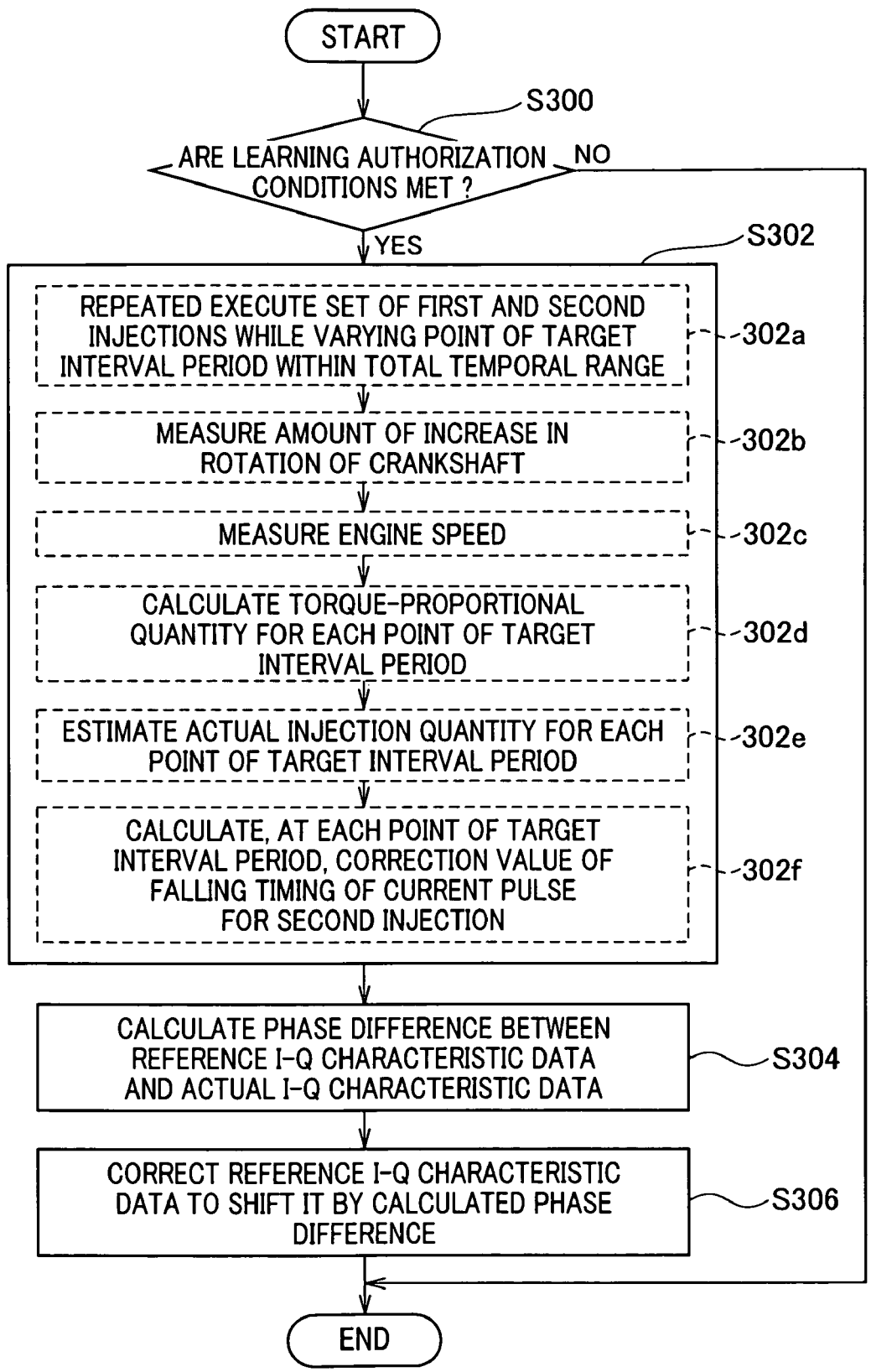
FIG. 6 is a flowchart schematically illustrating a learning routine to be executed by an ECU illustrated in FIG. 2 according to the first embodiment.

The ECU 40 is programmed to launch and carry out a routine (learning routine) loaded in, for example, the RAM 56 and illustrated in FIG. 6 every predetermined cycle. The operations of the ECU 40 in accordance with the learning routine are basically identical to those illustrated in the EP Patent Application Publication No. EP 1491751 A1. Because the EP Patent Application Publication is assigned to the same assignee as that of this application, disclosures of which are incorporated herein by reference.

When the learning routine is launched during execution of the fuel injection control mode, the CPU 52 serves as the actual I-Q characteristic data computing module 52a to determine whether the following learning authorization conditions are met in step S300:

(A) A target injection quantity determined by the ECU 40 is equal to or lower than zero; and (B) The actual accelerator position or stroke of the accelerator pedal is set to zero based on the data measured by the accelerator sensor 81.

Note that the circumstances of the target injection quantity being set to be lower than zero will be described hereinafter.

Specifically, a current pulse width of the pulse current to be applied to a given injector 30, which corresponds to "zero" of the target injection quantity, has been determined; this current pulse width will be referred to as "zero-injection pulse width" hereinafter. Thus, when the pulse current with the zero-injection pulse width is applied to a given injector 30, the quantity of fuel actually sprayed from the given injector 30 should become normally zero.

However, a fuel-spray characteristic of an injector 30 may be different from a corresponding reference fuel spray characteristic due to its fabrication variation and/or its aging. For this reason, when the pulse current with the zero-injection pulse width is applied to a given injector 30, the quantity of fuel actually sprayed from the given injector 30 may not become zero. In other words, although the target injection quantity is set to be zero, the given injector 30 may spray an amount of fuel.

It is assumed that an injector 30 has the fuel-spray characteristic in that the quantity of fuel to be actually sprayed therefrom is not zero upon the target injection quantity of zero being set therefor.

In this assumption, in order to set the quantity of fuel to be actually sprayed from the injector 30 to zero, the ECU 40 works to apply, to the injector 30, the pulse current with a current pulse width corresponding to a negative value of the target injection quantity; this current pulse width is shorter than the zero-injection pulse width. This allows the quantity of fuel to be actually sprayed from the injector 30 to become zero.

Upon determining that the learning authorization conditions are met (YES in step S300), the CPU 52 proceeds to step S302, and otherwise (NO in step S300), terminating the learning routine.

In step S302, the CPU 52 operates in a learning mode to instruct an injector (target injector) 30, which is selected as a learned injector based on the learning authorization conditions satisfying timing, to spray a first target quantity of fuel in a first injection.

After a value (point) of a target interval period has elapsed since the stop of the spray of fuel in the first injection, the CPU 52 instructs the target injector 30 to spray a second target quantity of fuel in a second injection.

In step S302, the CPU 52 repeatedly carries out a set of the first injection and second injection while varying the point of the target interval period within the total temporal range usable for the target interval period (see 302a of step S302).

In step S302, the CPU 52 measures an amount of increase in rotation of the crankshaft 66 based on each set of the first and second injections based on the measured data of the engine speed sensor 80 (see 302b of step S302). The CPU 52 also measures an engine speed at the timing of each set of the first and second injections based on the measured data of the engine speed sensor 80 (see 302c of step S302).

In step S302, the CPU 52 calculate, as a torque-proportional quantity for each point of the target interval period, the product of the measured amount of increase in rotation of the crankshaft 66 and the measured engine speed (see 302d of step S302). The CPU 52 estimates, based on the torque-proportional quantity for each point of the target interval period, an engine torque for each point of the target interval period to thereby estimate, based on the estimated engine torque for each point of the target interval period, an actual injection quantity for each point of the target interval period by a corresponding one set of the first and second injections (302e of step S302).

In step S302, the CPU 52 calculates, at each point of the target interval period, a correction value of the falling timing of a current pulse to be applied to the target injector 30 in the second injection based on the estimated actual injection quantity for each point of the target interval period (302f of step S302). In step 302f of step S302, the CPU 52 generates actual I-Q characteristic data based on the correction value of the falling timing of the current pulse to be applied to the target injector 30 in the second injection at each point of the target interval period. The correction value at each point of the target interval period allows change of the quantity of fuel actually sprayed from the target injector 30 at a corresponding one point of the target interval period to be matched with the second target injection quantity for the second injection at the corresponding one point of the target interval period.

Figure 7:
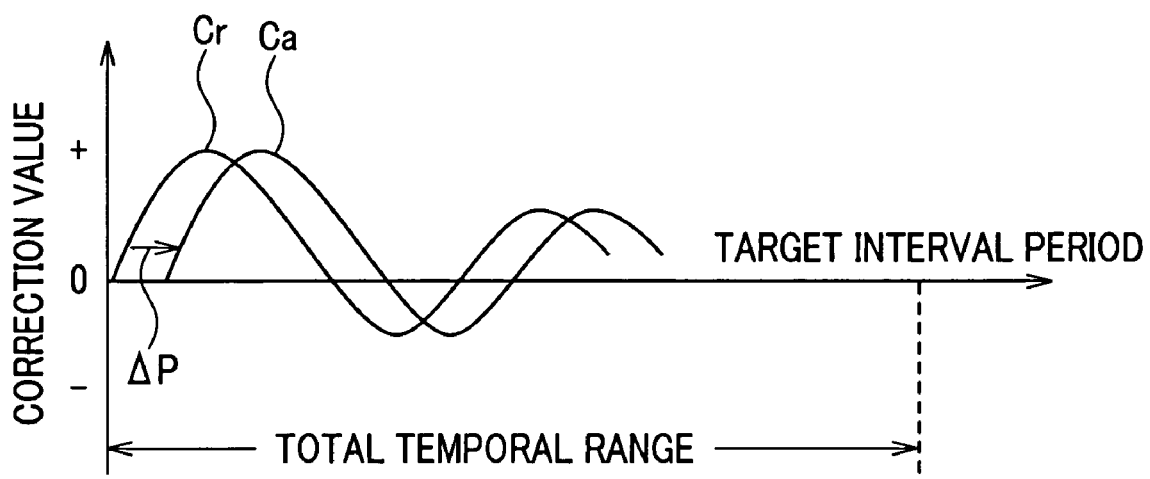
FIG. 7 is a view schematically illustrates a graphical representation of actual I-Q characteristic data and that of reference I-Q characteristic data according to the first embodiment.

FIG. 7 schematically illustrates a graphical representation Ca of the actual I-Q characteristic data and a graphical representation Cr of the reference I-Q characteristic data assuming that each of the actual I-Q characteristic data and the reference I-Q characteristic data has a substantially sinusoidal wave while gradually reducing its amplitude.

Next, in step S304, the CPU 52 serves as the phase difference calculating module 52b to read the reference I-Q characteristic data from the EEPROM 58, and to calculate a phase difference $\Delta P$ between the reference I-Q characteristic data and the actual I-Q characteristic data (see FIG. 7).

Subsequently, in step S306, the CPU 52 serves as the phase correction module 52c to correct the reference I-Q characteristic data to thereby shift the reference I-Q characteristic data by the calculated phase difference such that the reference I-Q characteristic data is matched with the actual I-Q characteristic data.

Next, the CPU 52 stores the corrected reference I-Q characteristic data in, for example, the EEPROM 58 in step S306, terminating the learning routine.

Thereafter, when requiring the multiple injection, the ECU 40 serves as the fuel-spray correction module 52d to output, to at least one injector 30, a current pulse with a current pulse width corresponding to a determined target injection quantity; this current pulse instructs the at least one injector 30 to spray the determined target injection quantity into a corresponding cylinder 62.

After a determined value of the target interval period has elapsed from the falling edge of the current pulse, the ECU 40 references the corrected I-Q characteristic data stored in the EEPROM 58 to retrieve a correction value corresponding to the determined value of the target interval period.

Then, the ECU 40 corrects a current pulse width of a current pulse to be applied to the at least one injector 30 based on the retrieved correction value; this current pulse width corresponds to a determined target injection quantity. Thereafter, the ECU 40 outputs the corrected current pulse to the at least one injector 30 to thereby instructing the at least one injector 30 to spray a quantity of fuel based on the corrected current pulse.

This allows a quantity of fuel actually sprayed from the at least one injector 30 to be matched with the determined target quantity with little influence on variations in an actual interval period between the first and second injections.

As described above, the fuel injection system 10 according to the first embodiment is designed to focus on the fact that:

a deviation of an actual I-Q characteristic from the reference I-Q characteristic substantially appears in mainly phase due to variations (fabrication variations) of injectors 30 and an aging of each injector 30 except for in magnitude offset, period, or amplitude.

Specifically, the fuel injection system 10 is designed to correct the reference I-Q characteristic data to shift it in phase such that the reference I-Q characteristic is substantially in agreement with the actual I-Q characteristic data. This makes it possible to correct, based on the corrected reference I-Q characteristic data, a quantity of fuel actually sprayed from a latter injection following a former injection in the multiple injection mode.

This achieves an effect of correcting a quantity of fuel actually sprayed from a latter injection following a former injection in the multiple injection mode with high accuracy throughout a total temporal range used for the target injection period.

Second Embodiment

A fuel injection system according to a second embodiment of the present invention will be described hereinafter In the second embodiment, a hardware structure of the fuel injection system according to the second embodiment is identical to that of the fuel injection system 10 according to the first embodiment. For this reason, the illustration of the hardware structure of the fuel injection system to the second embodiment is omitted.

Like reference characters are therefore assigned to like parts in the fuel injection systems according to the first and second embodiments, and different functions of the fuel injection system according to the second embodiment from those of the fuel injection system 10 according to the first embodiment will be described hereinafter.

Figure 8:
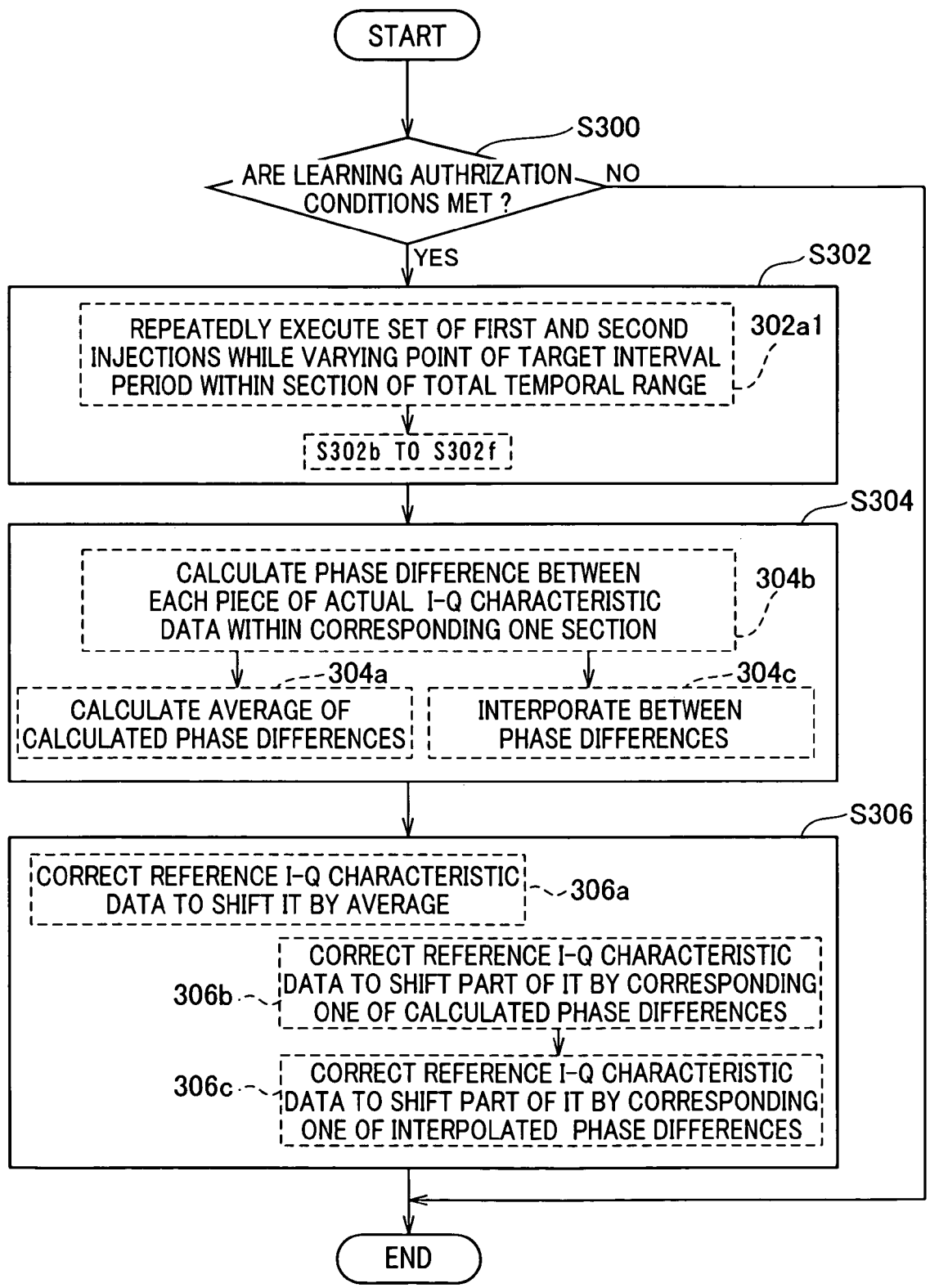
FIG. 8 is a flowchart schematically illustrating a learning routine to be executed by an ECU according to a second embodiment of the present invention.

In the second embodiment, upon determining that the learning authorization conditions are met (YES in step S300 of FIG. 8), the CPU 52 operates in a learning mode to instruct an injector (target injector) 30, which is selected as a learned injector based on the learning authorization conditions satisfying timing, to spray a first target quantity of fuel in a first injection.

After a value (point) of a target interval period has elapsed since the stop of the spray of fuel in the first injection, the CPU 52 instructs the target injector 30 to spray a second target quantity of fuel in a second injection.

In step S302, the CPU 52 repeatedly carries out a set of the first injection and second injection while varying the point of the target interval period within at least one section of the total temporal range usable for the target interval period (see 302a1 of step S302).

Thereafter, the CPU 52 carries out the operations of steps S302b to S302f to thereby generates actual I-Q characteristic data based on the correction value of the falling timing of the current pulse to be applied to the target injector 30 in the second injection at each point of the at least one section of the target interval period.

How to determine the at least one section of the total temporal range usable for the target interval period will be described hereinafter.

(a) Section Including Half Period of Reference I-Q Characteristic Data

In step S302a1, the CPU 52 sets at least one region including a half period of the reference I-Q characteristic data as the at least one section of the total temporal range, and repeatedly carries out a set of the first injection and second injection while varying the point of the target interval period within the at least one region.

The at least one region including a half period of the reference I-Q characteristic data set as the at least one section of the total temporal range allows generation of the actual I-Q characteristic data within part of the total temporal range as narrow as possible.

The at least one region including a half period of the reference I-Q characteristic data is set to be slightly wider than a half period of the reference I-Q characteristic data by consideration of a phase shift of the generated actual I-Q characteristic data so that a location of the reference I-Q characteristic data relative to the generated actual I-Q characteristic data can be easily determined.

Figure 9A:
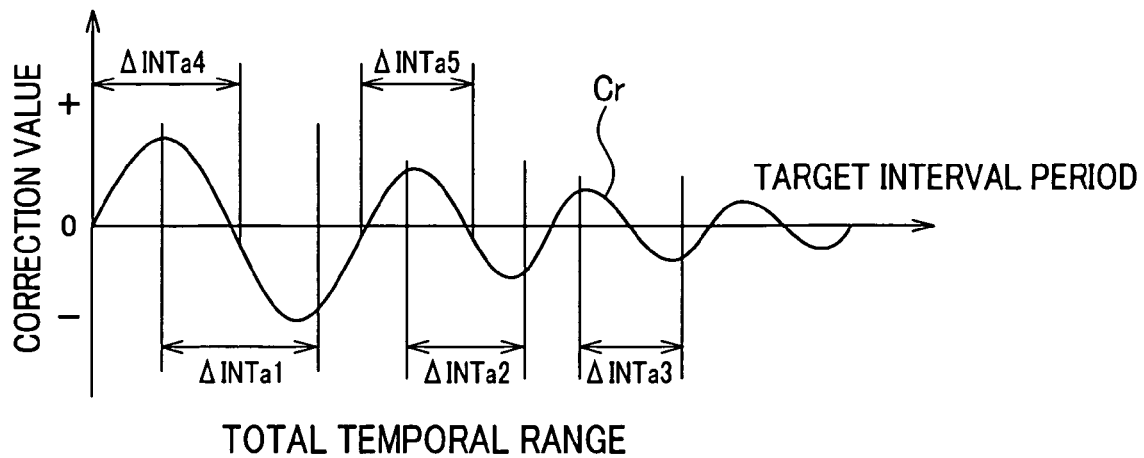
FIG. 9A is a view schematically illustrating a graphical representation of the reference I-Q characteristic data and examples of sections of a total temporal range usable for the target interval period according to the second embodiment.

For example, as illustrated in FIG. 9A, a region $\Delta$INTa1, $\Delta$INTa2, or $\Delta$INTa3 including a half period of the reference I-Q characteristic data Cr between temporally adjacent local maximum and minimum points on the reference I-Q characteristic data Cr can be set as the at least one section of the total temporal range.

Because a temporal length in the region $\Delta$INTa1, $\Delta$INTa2, or $\Delta$INTa3 is the greatest in another half period of the reference I-Q characteristic data Cr, it is possible to easily determine a location of the reference I-Q characteristic data Cr relative to the generated actual I-Q characteristic data. This prevents incorrect determination of a location of the reference I-Q characteristic data Cr relative to the generated actual I-Q characteristic data.

As another example, a region including any one of a crest or trough of the reference I-Q characteristic data Cr can be set as the at least one section of the total temporal range so that a quantity of fuel actually sprayed from the target injector 30 is as small as possible.

In the second embodiment, as described above, the sign of the correction value in the reference I-Q characteristic data Cr at a given value of the target interval period is positive when a quantity of fuel actually sprayed from an injector 30 corresponding to the given value of the target interval period is lower than a corresponding target injection quantity.

For this reason, as illustrated in FIG. 9A, a region $\Delta$INTa4 or $\Delta$INTa5 including a crest of the reference I-Q characteristic data Cr can be set as the at least one section of the total temporal range. This makes it possible to reduce combustion noise and/or a variation in torque of the diesel engine during the first and second injections in the learning mode.

(b) Section Corresponding to Short Target Interval Period

In FIG. 9A, regions $\Delta$INTa1 and $\Delta$INTa4 are within a part of the target interval period corresponding to the first period of the reference I-Q characteristic data Cr since the stop of the spray of fuel in the first injection. Regions $\Delta$INTa2 and $\Delta$INTa2 are within a part of the target interval period corresponding to the second period of the reference I-Q characteristic data Cr.

Figure 9B:
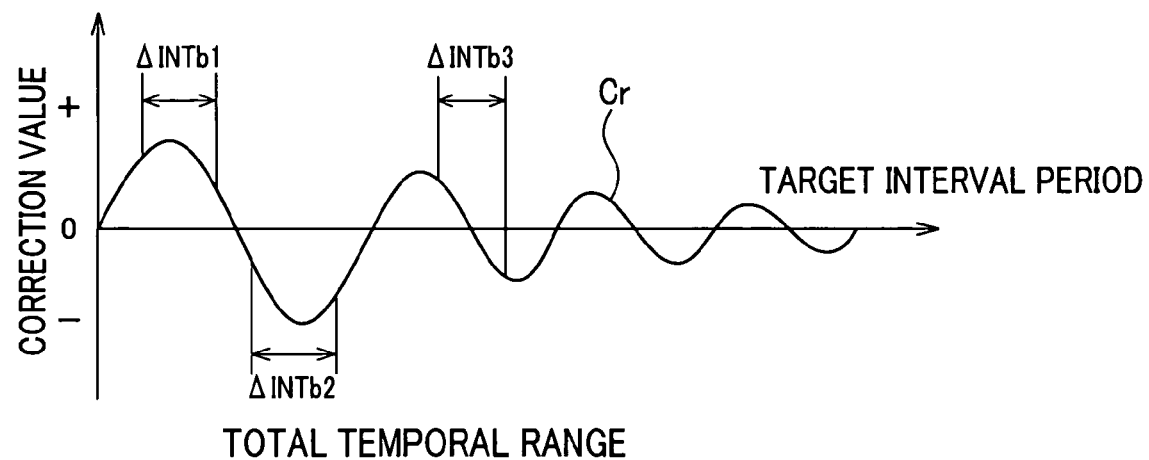
FIG. 9B is a view schematically illustrating a graphical representation of the reference I-Q characteristic data and alternative examples of sections of a total temporal range usable for the target interval period according to the second embodiment.

Similarly, in FIG. 9B, regions $\Delta$INTb1 and $\Delta$INTb2 are within a region of the target interval period corresponding to the first period of the reference I-Q characteristic data Cr since the stop of the spray of fuel in the first injection. A region $\Delta$INTb3 is within a part of the target interval period corresponding to the second period of the reference I-Q characteristic data Cr.

As clearly illustrated in FIGS. 9A and 9B, the greater a displacement of the reference I-Q characteristic data Cr is, the shorter a value of the target interval period is.

For this reason, in a case of FIG. 9A, the region $\Delta$INTa4 or $\Delta$INTa1 can be preferably set as the at least one section of the total temporal range as compared with the region $\Delta$INTa5, $\Delta$INTa2, or $\Delta$INTa3.

In a case of FIG. 9B, the region $\Delta$INTb1 or $\Delta$INTb2 can be set as the at least one section of the total temporal range as compared with the region $\Delta$INTb3.

Specifically, it is possible to easily determine a location of the reference I-Q characteristic data Cr relative to the generated actual I-Q characteristic data because the reference I-Q characteristic data Cr has a large displacement within a region corresponding to a short value of the target interval period of the reference I-Q characteristic data Cr. This also prevents incorrect determination of a location of the reference I-Q characteristic data Cr relative to the generated actual I-Q characteristic data.

In the case (b), the region $\Delta$INTa4 or $\Delta$INTa1 set as the at least one section of the total temporal range can preferably include a half period of the reference I-Q characteristic data. Similarly, the region $\Delta$INTb1 or $\Delta$INTb2 set as the at least one section of the total temporal range can preferably include a half period of the reference I-Q characteristic data. This more prevents incorrect determination of a location of the reference I-Q characteristic data Cr relative to the generated actual I-Q characteristic data.

(c) Sections within Total Temporal Range

For example, at least two of the regions $\Delta$INTa4, $\Delta$INTa1, and $\Delta$INTa5 in a case of FIG. 9A, or the regions $\Delta$INTb1, $\Delta$INTb2, and $\Delta$INTb3 in a case of FIG. 9B can be set as the sections of the total temporal range. In the case (c), each of the regions is shorter than a half cycle of the reference I-Q characteristic data. This easily determines a location of the reference I-Q characteristic data Cr relative to the generated actual I-Q characteristic data, and prevents incorrect determination of a location of the reference I-Q characteristic data Cr relative to the generated actual I-Q characteristic data.

Figure 9C:
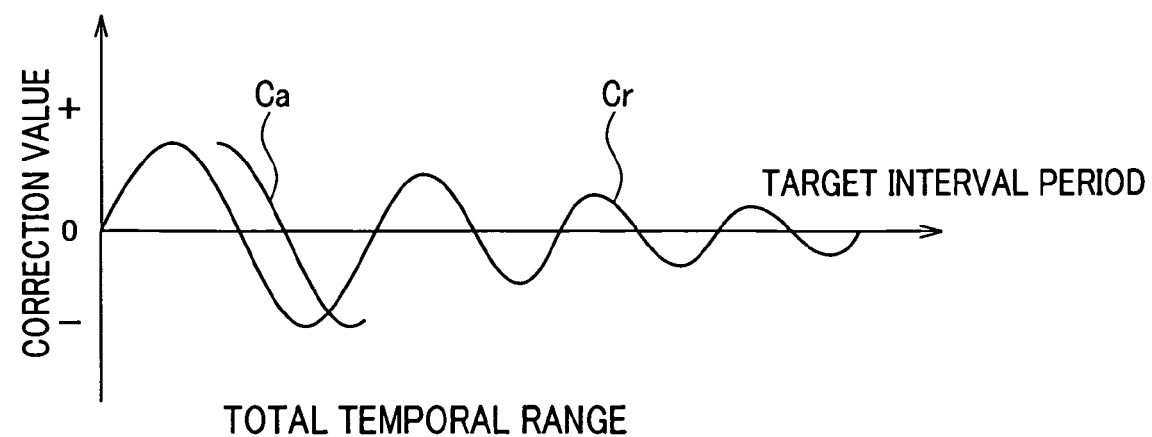
FIG. 9C is a view schematically illustrating a graphical representation of generated actual I-Q characteristic data corresponding to a region Δ INTa1 including a half period of the reference I-Q characteristic data illustrated in FIG. 9A.
Figure 10:
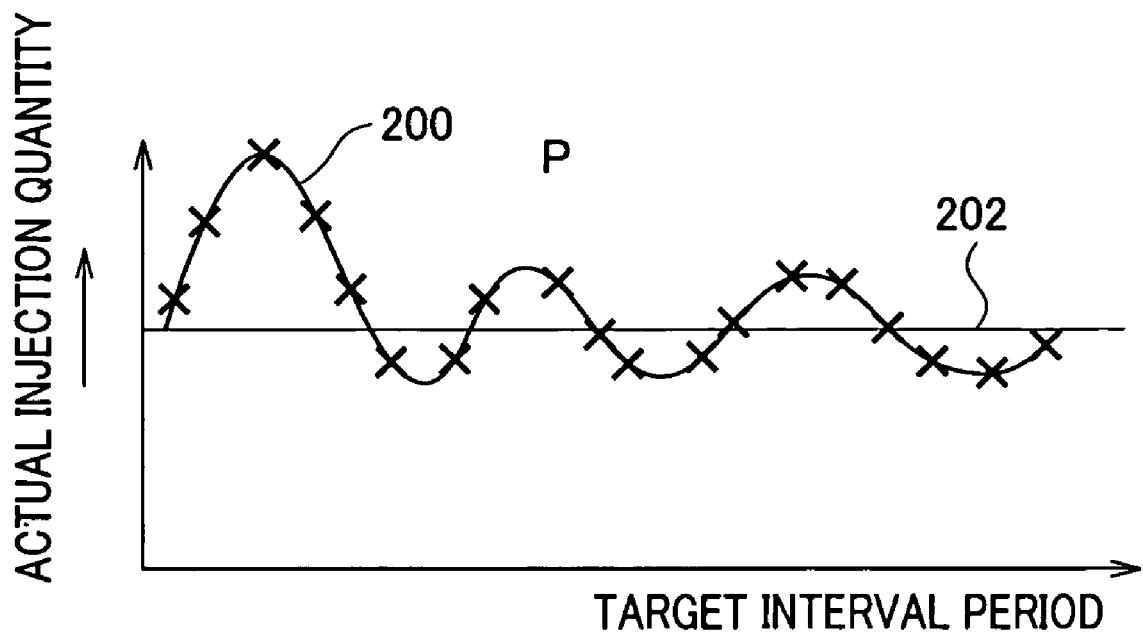
FIG. 10 is a view schematically illustrating a relationship between a graphical representation of a reference injection quantity and actual injection quantities.

For example, FIG. 9C illustrates the generated actual I-Q characteristic data corresponding to the region ΔINTa1 including a half period of the reference I-Q characteristic data.

Next, in step S304, the CPU 52 serves as the phase difference calculating module 52b to read the reference I-Q characteristic data from the EEPROM 58, and to calculate a phase difference ΔP between the reference I-Q characteristic data and the actual I-Q characteristic data.

When pieces of the actual I-Q characteristic data are calculated in a plurality of points of the at least one section of the reference I-Q characteristic data, the CPU 52 calculates a phase difference between the reference I-Q characteristic data and each piece of the actual I-Q characteristic data in the following processes.

Specifically, in the first process, the CPU 52 calculates a phase difference between each piece of the actual I-Q characteristic data and part of the reference I-Q characteristic data within a corresponding one section, and calculates an average of the calculated phase differences (step S304a).

In the second process, the CPU 52 calculates a phase difference between each piece of the actual I-Q characteristic data and part of the reference I-Q characteristic data within a corresponding one section (step S304b). The second process can correct the reference I-Q characteristic data within each section thereof with high accuracy when the phase difference between each piece of the actual I-Q characteristic data and part of the reference I-Q characteristic data within a corresponding one section is small.

After completion of the second process, the CPU 52 interpolates between the phase differences between each piece of the actual I-Q characteristic data and a corresponding part of the reference I-Q characteristic data in step S304c. Thus, it is possible to eliminate the need of obtaining pieces of the actual I-Q characteristic data within the remaining sections of the reference I-Q characteristic data.

Subsequently, in step S306, the CPU 52 serves as the phase correction module 52c to correct the reference I-Q characteristic data illustrated in FIGS. 9A and 9B to thereby shift the reference I-Q characteristic data based on the calculated phase differences such that the reference I-Q characteristic data closely approaches the pieces of the actual I-Q characteristic data.

When the average of the calculated phase differences is calculated in step S304a, the CPU 52 corrects the reference I-Q characteristic data to thereby shift the reference I-Q characteristic data by the average of the calculated phase differences such that the reference I-Q characteristic data closely approaches the pieces of the actual I-Q characteristic data in step S306a.

When the phase differences are calculated in step S304b, the CPU 52 corrects the reference I-Q characteristic data to thereby shift a part of the reference I-Q characteristic data corresponding to each of the regions by a corresponding one of the calculated phase differences such that the reference I-Q characteristic data closely approaches the pieces of the actual I-Q characteristic data in step S306b.

After completion of the process S306b, the CPU 52 corrects the reference I-Q characteristic data to thereby shift a part of the reference I-Q characteristic data corresponding to each of the remaining regions by a corresponding one of the interpolated phase differences such that the reference I-Q characteristic data closely approaches the pieces of the actual I-Q characteristic data in step S306c.

Next, the CPU 52 stores the corrected reference I-Q characteristic data in, for example, the EEPROM 58 in step S306, terminating the learning routine.

Thereafter, when requiring the multiple injection, the ECU 40 serves as the fuel-spray correction module 52d to output, to at least one injector 30, a current pulse with a current pulse width corresponding to a determined target injection quantity; this current pulse instructs the at least one injector 30 to spray the determined target injection quantity into a corresponding cylinder 62.

After a determined value of the target interval period has elapsed from the falling edge of the current pulse, the ECU 40 references the corrected I-Q characteristic data stored in the EEPROM 58 to retrieve a correction value corresponding to the determined value of the target interval period.

Then, the ECU 40 corrects a current pulse width of a current pulse to be applied to the at least one injector 30 based on the retrieved correction value; this current pulse width corresponds to a determined target injection quantity. Thereafter, the ECU 40 outputs the corrected current pulse to the at least one injector 30 to thereby instructing the at least one injector 30 to spray a quantity of fuel based on the corrected current pulse.

This allows a quantity of fuel actually sprayed from the at least one injector 30 to be matched with the determined target quantity with little influence on variations in an actual interval period between the first and second injections.

As described above, the fuel injection system according to the second embodiment is designed to repeatedly carry out a set of the first injection and second injection while varying the point of the target interval period within at least one section of the total temporal range usable for the target interval period to thereby generate at least one piece of the actual I-Q characteristic data corresponding to the at least one section of the target interval period.

Thereafter, the fuel injection system according to the second embodiment is designed to correct the reference I-Q characteristic data to shift it based on at least one calculated phase difference between the at least one piece of the actual I-Q characteristic data and the reference I-Q characteristic data. This results in that the reference I-Q characteristic data closely approaches the at least one piece of the actual I-Q characteristic data.

This makes it possible to correct, based on the corrected reference I-Q characteristic data, a quantity of fuel actually sprayed from a latter injection following a former injection in the multiple injection mode.

This achieves, in addition to the effects achieved by the first embodiment, an effect of correcting a quantity of fuel actually sprayed from a latter injection following a former injection in the multiple injection mode with high accuracy throughout a total temporal range used for the target injection period while reducing an amount of the learning required before the learning is completed.

In each of the first and second embodiments, the fuel injection system is configured to correct the falling timing of the current pulse to be applied to a target injector 30 in a latter injection following a former injection in the multiple injection mode to thereby correct the current pulse width of the current pulse. This results in correcting a quantity of fuel actually sprayed from the target injector 30 in the latter injection. The present invention is however not limited to the configuration.

Specifically, the fuel injection system is configured to correct a spray timing of a target injector 30 in the latter injection in the multiple injection mode to thereby correct a quantity of fuel actually sprayed from the target injector 30 in the latter injection.

In each of the first and second embodiments, as each of reference I-Q characteristic data and actual I-Q characteristic data, a reference relationship between target interval period from a former injection by each injector 30 to a latter injection following the former injection and correction value of a quantity of fuel actually sprayed from a corresponding one injector 30 in the latter injection is used.

However, as each of reference I-Q characteristic data and actual I-Q characteristic data, a reference relationship between target interval period from a former injection by each injector 30 to a latter injection following the former injection and correction value of a total quantity of fuel actually sprayed from a corresponding one injector 30 in both the former injection and latter injection can be used.

As temporally adjacent fuel injections (former injection and latter injection), some of multiple shots of fuel in the multiple injection mode, which are temporally adjacent to each other, can be combined.

The present invention is not limited to the first and second embodiments, and can be modified as described hereinafter.

The learning routine can be carried out at each rail pressure within a predetermined acceptable pressure range.

A pressure limiter can be installed in the common rail 20. The pressure limiter is operative to discharge fuel charged in the common rail 20 to thereby reduce the rail pressure such that the rail pressure does not exceed a preset upper limit. In place of or in addition to the pressure liter, a pressure reducing valve for reducing the rail pressure under control of the ECU 40 can be used.

In each of the first and second embodiments, as the internal combustion engine, the diesel engine 60 is used, but the present invention is not limited to the structure. Specifically, a spark-ignited gasoline engine, such as a direct-injection gasoline engine, can be used as the internal combustion engine.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. An apparatus for controlling, in a multiple injection mode, an injector to spray a quantity of fuel into an internal combustion engine in a former injection, and after a target interval period has elapsed, controlling the injector to spray a quantity of fuel into the internal combustion engine in a latter injection, the apparatus comprising:
    a storing unit configured to store therein a reference fuel spray characteristic of the injector relative to a variable of a target interval period within a usable range determined for the target interval period, the target interval period representing an interval between a stop of a spray of fuel by the injector in the former injection and start of spraying fuel by the injector in the latter injection, the reference fuel spray characteristic at least depending on a quantity of fuel actually sprayed from the injector in the latter injection;
    an actual fuel spray characteristic obtaining unit configured to obtain an actual fuel spray characteristic of the injector relative to the variable of the target interval period within at least one section in the usable range;
    a phase difference calculating unit configured to calculate a phase difference between the reference fuel spray characteristic and the obtained actual fuel spray characteristic; and
    a phase correcting unit configured to shift the reference fuel spray characteristic by the calculated phase difference such that the reference fuel spray characteristic is corrected to approach the obtained actual fuel spray characteristic.

2. The apparatus according to claim 1, further comprising:
    a fuel-spray correcting unit configured to correct the injector based on the corrected reference fuel spray characteristic so as to control a quantity of fuel actually sprayed from the injector in the latter injection.

3. The apparatus according to claim 1, wherein the actual fuel spray characteristic obtaining unit is configured to operate in a learning mode to carry out:
    a first injection that outputs an instruction value to the injector, the instruction value instructing the injector to spray a first target quantity of fuel; and
    a second injection that, after a value of the variable of the target interval period has elapsed since a stop of a spray of fuel by the injector in the first injection, outputs an instruction value to the injector, the instruction value instructing the injector to spray a second target quantity of fuel in a second injection; and
    repeat a set of the first and second injections while changing the value of the variable of the target interval period within the at least one section of the usable range, and
    the actual fuel spray characteristic obtaining unit is configured to obtain the actual fuel spray characteristic of the injector relative to the variable of the target interval period within the at least one section in the usable range based on a result of the repeat of the set of the first and second injections.

4. The apparatus according to claim 1, wherein the storing unit is configured to store therein the reference fuel spray characteristic in map format.

5. The apparatus according to claim 1, wherein the storing unit is configured to store therein the reference fuel spray characteristic in function formula format.

6. The apparatus according to claim 1, wherein the reference fuel spray characteristic represents a reference relationship between a variable of the target interval period and a variable of a correction value of a quantity of fuel actually sprayed from the injector in the latter injection, and the actual fuel spray characteristic represents an actual relationship between a variable of the target interval period and a variable of the correction value of the quantity of fuel actually sprayed from the injector in the latter injection.

7. The apparatus according to claim 1, wherein the reference fuel spray characteristic represents a reference relationship between a variable of the target interval period and a variable of a correction value of a sum of a quantity of fuel actually sprayed from the injector in the former injection and a quantity of fuel actually sprayed from the injector in the latter injection, and the actual fuel spray characteristic represents an actual relationship between a variable of the target interval period and a variable of a correction value of a sum of a quantity of fuel actually sprayed from the injector in the former injection and a quantity of fuel actually sprayed from the injector in the latter injection.

8. The apparatus according to claim 1, wherein the reference fuel spray characteristic substantially periodically varies, and the at least one section in the usable range includes a half period of the reference fuel spray characteristic.

9. The apparatus according to claim 8, wherein the reference fuel spray characteristic has temporally adjacent local maximum and minimum points, and the half period of the reference fuel spray characteristic is located between the temporally adjacent local maximum and minimum points.

10. The apparatus according to claim 8, wherein the reference fuel spray characteristic has temporally adjacent local maximum and minimum points, and the half period of the reference fuel spray characteristic corresponds to any one of the local maximum point and the local minimum point, any one of the local maximum point and the local minimum point allowing a quantity of fuel actually sprayed from the injector in the latter injection to become small as compared with the other thereof.

11. The apparatus according to claim 8, wherein the at least one section in the usable range includes one of a plurality of the half periods of the reference fuel spray characteristic, a value of the target interval period corresponding to the one of the plurality of the half periods is shorter than that of the target interval period corresponding to another one of the plurality of the half periods.

12. The apparatus according to claim 1, wherein the at least one section in the usable range includes a plurality of sections in the usable range.

13. The apparatus according to claim 12, wherein the actual fuel spray characteristic obtaining unit is configured to obtain, based on the operation of the learning fuel injection instructing unit in the learning mode, a value of the actual fuel spray characteristic of the injector relative to the variable of the target interval period within each of the plurality of sections in the usable range.

14. The apparatus according to claim 13, wherein the phase difference calculating unit is configured to:
calculate phase differences between the reference fuel spray characteristic and the obtained value of the actual fuel spray characteristic within each of the plurality of sections in the usable range; and
calculate an average of the calculated phase differences between the reference fuel spray characteristic and the obtained values of the actual fuel spray characteristic within the respective sections in the usable range, and
the phase correcting unit is configured to shift the reference fuel spray characteristic by the calculated average of the calculated phase differences such that the reference fuel spray characteristic is corrected to approach the obtained values of the actual fuel spray characteristic.

15. The apparatus according to claim 13, wherein the phase difference calculating unit is configured to calculate phase differences between the reference fuel spray characteristic and the obtained value of the actual fuel spray characteristic within each of the plurality of sections in the usable range, and the phase correcting unit is configured to shift a part of the reference fuel spray characteristic corresponding to each of the plurality of sections by a corresponding one of the calculated phase differences such that the reference fuel spray characteristic is corrected to approach the obtained values of the actual fuel spray characteristic.

16. The apparatus according to claim 15, wherein the phase difference calculating unit is configured to interpolate between the calculated phase differences to thereby calculate interpolate phase differences, and the phase correcting unit is configured to shift a part of the reference fuel spray characteristic corresponding to each of remaining sections within the usable range by a corresponding one of the interpolated phase differences such that the reference fuel spray characteristic is corrected to approach the obtained values of the actual fuel spray characteristic.

17. A fuel injection system comprising:
an accumulator;
a fuel pump configured to pressurize fuel and feed the pressurized fuel to the accumulator so that the pressurized fuel is stored in the accumulator;
an injector for injecting the fuel stored in the accumulator into a cylinder of an internal combustion engine; and
an apparatus for controlling, in a multiple injection mode, the injector to spray a quantity of fuel into the internal combustion engine in a former injection, and after a target interval period has elapsed, controlling the injector to spray a quantity of fuel into the internal combustion engine in a latter injection, the apparatus comprising:
a storing unit configured to store therein a reference fuel spray characteristic of the injector relative to a variable of a target interval period within a usable range determined for the target interval period, the target interval period representing an interval between a stop of a spray of fuel by the injector in the former injection and start of spraying fuel by the injector in the latter injection, the reference fuel spray characteristic at least depending on a quantity of fuel actually sprayed from the injector in the latter injection;
an actual fuel spray characteristic obtaining unit configured to obtain an actual fuel spray characteristic of the injector relative to the variable of the target interval period within at least one section in the usable range;
a phase difference calculating unit configured to calculate a phase difference between the reference fuel spray characteristic and the obtained actual fuel spray characteristic; and
a phase correcting unit configured to shift the reference fuel spray characteristic by the calculated phase difference such that the reference fuel spray characteristic is corrected to approach the obtained actual fuel spray characteristic.

* * * * *